United States Patent [19]

Williams, Jr.

[11] 4,074,455
[45] Feb. 21, 1978

[54] FISHING LURE

[76] Inventor: William O. Williams, Jr., 1309 Lynhurst Drive, Gastonia, N.C. 28052

[21] Appl. No.: 704,453

[22] Filed: July 12, 1976

[51] Int. Cl.² ............................................. A01K 85/00
[52] U.S. Cl. ................................. 43/42.06; 43/42.25; 43/42.28; 43/42.31; 43/42.34; 43/42.4
[58] Field of Search ................. 43/42.31, 42.06, 42.34, 43/42.28, 42.1, 42.25, 42.4, 42.09

[56] References Cited

U.S. PATENT DOCUMENTS

| 1,898,740 | 2/1933 | Novitzky | 43/42.34 |
| 2,117,206 | 5/1938 | Neff | 43/42.34 |
| 2,306,181 | 12/1942 | Neumann | 43/42.1 |
| 2,765,572 | 10/1956 | Woolfe | 43/42.06 |
| 3,108,389 | 10/1963 | McGuire | 43/42.06 |
| 3,191,336 | 6/1965 | Cordell, Jr. | 43/42.28 |
| 3,979,853 | 9/1976 | Storm et al. | 43/42.31 |

FOREIGN PATENT DOCUMENTS

| 102,405 | 6/1963 | Norway | 43/42.4 |

Primary Examiner—Russell R. Kinsey
Assistant Examiner—Daniel J. Leach
Attorney, Agent, or Firm—Richards, Shefte & Pinckney

[57] ABSTRACT

A fishing lure having a moldable soft plastic body formed with a surface having a plurality of closely spaced relatively small pockets of generally semispherical configuration that releasably retain air bubbles therein when the lure is immersed; the bubbles provide a scaly appearance and a glistening effect on the surface of the lure and the release of the bubbles creates a lifelike breathing effect for enhanced visual and vibrational fish attraction. A tail of flat flexible strip material or of hair-like strands has an inner end embedded in the moldable plastic body for easy and secure attachment of the tail to the body. With the flat flexible strip material holes are formed in and a stiffener coating is provided on the inner end for effective securement in the body, and with the hair-like strands a base is formed at the inner end for the same purpose.

For further enhanced fish attraction, a component is provided having an outwardly projecting array of hair-like strands with inner ends secured in an attaching ring carried by the lure. The strands are arranged in separate sets, each having a base secured in the ring and adjustably positionable around the ring for selective disposition of the strands thereabout.

12 Claims, 19 Drawing Figures

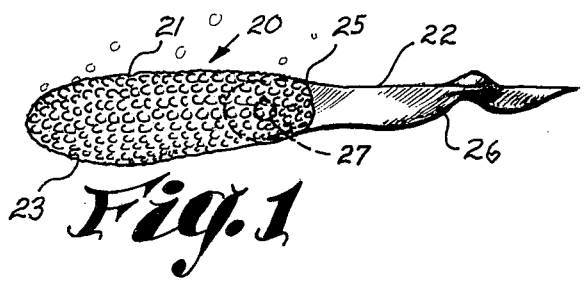
Fig. 1
Fig. 2
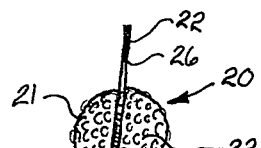
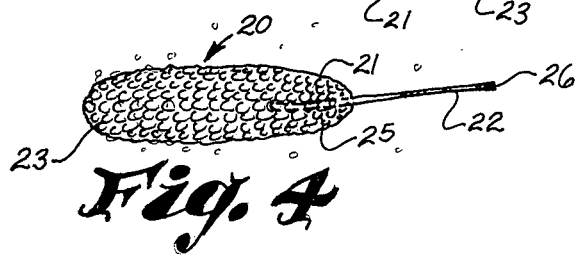
Fig. 3
Fig. 4
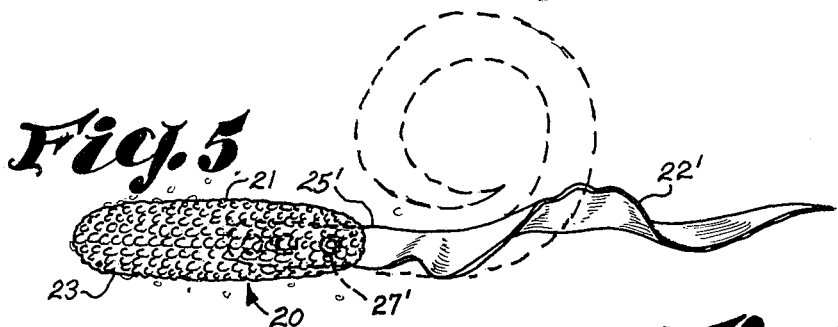
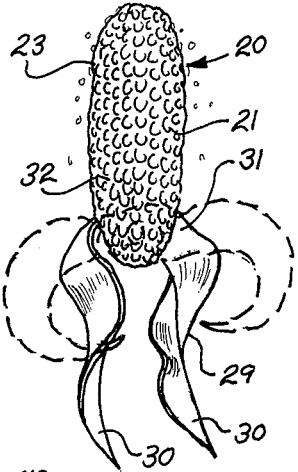
Fig. 5
Fig. 6
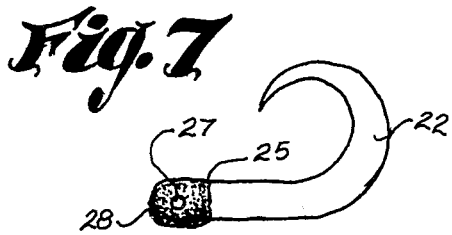
Fig. 7
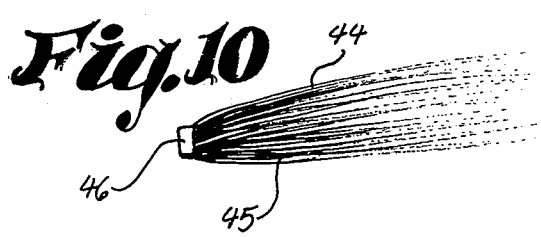
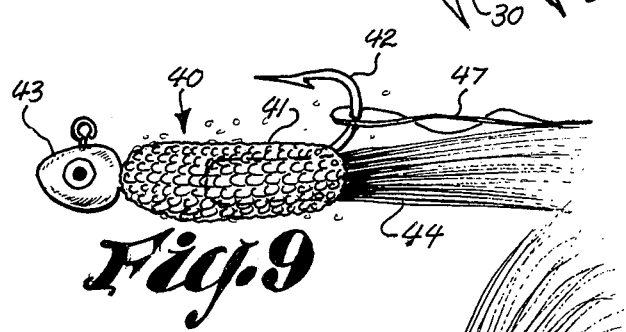
Fig. 10
Fig. 9
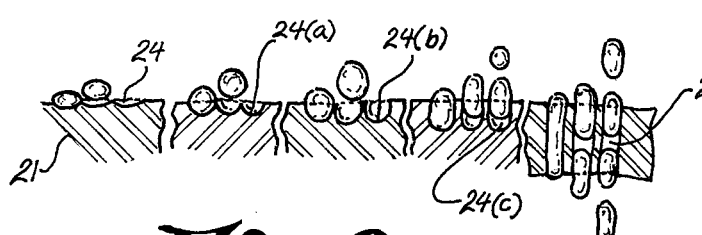
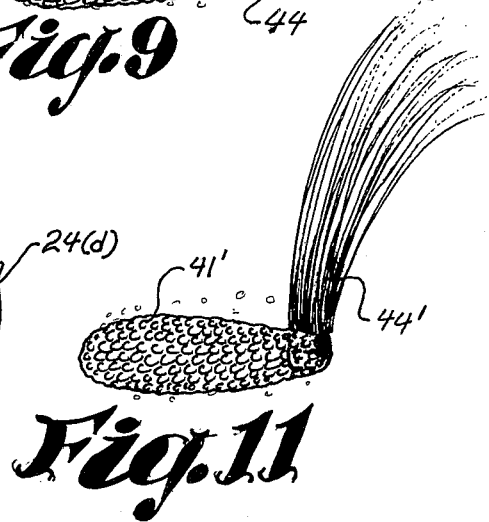
Fig. 8
Fig. 11

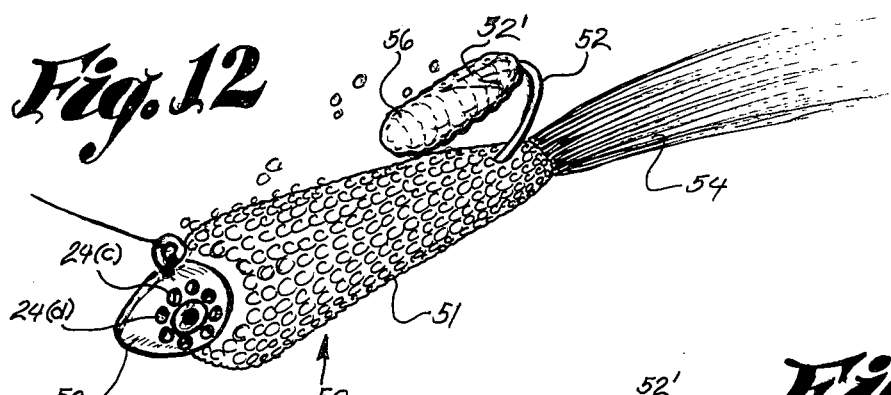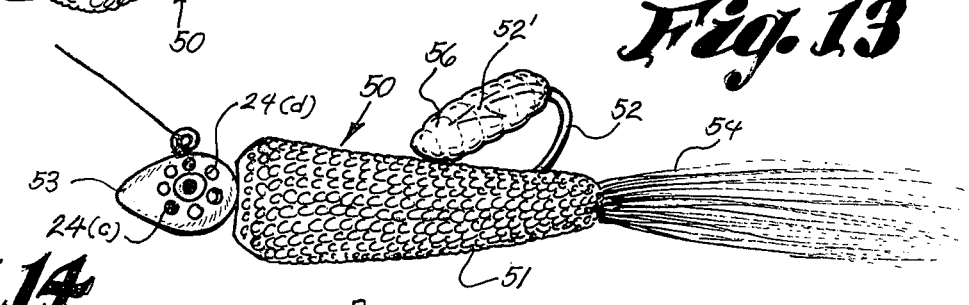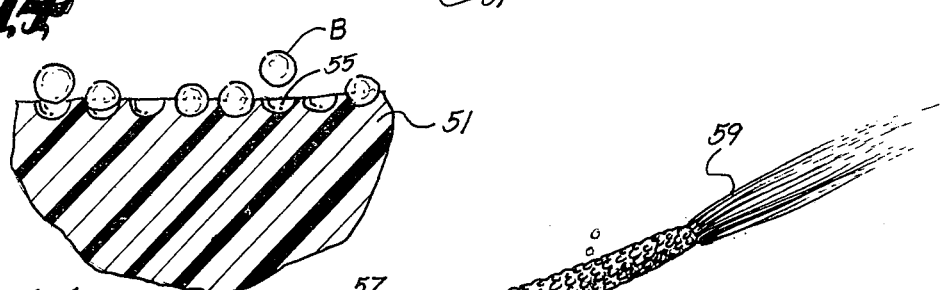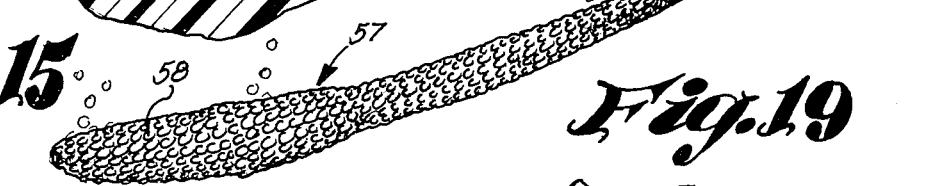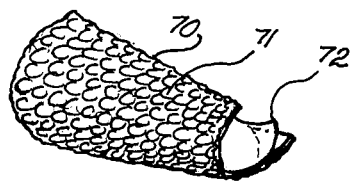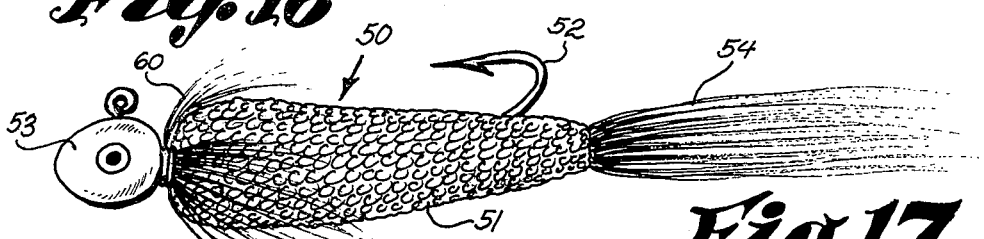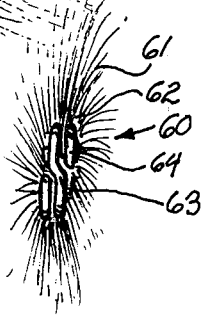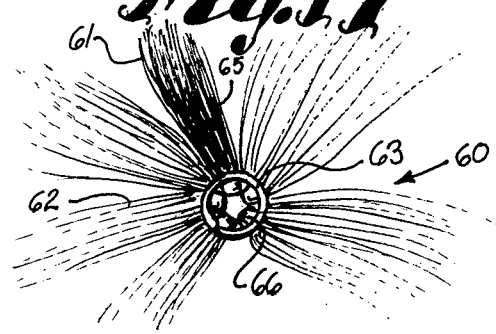

FISHING LURE

BACKGROUND OF THE INVENTION

The present invention relates to fishing lures and more particularly to the surface configuration, tail construction and projecting component construction for fishing lures.

There have been innumerable variations in surface configurations of fishing lures in attempts to provide the most effective fish attraction, but all of the known configurations have relied on the shape, color or finish of the surface itself for fish attraction. In contrast, the present invention utilizes a surface configuration that releasably retains air bubbles thereon with the bubbles providing a glistening scaly surface appearance and being naturally releasable to provide a life-like breathing effect.

In prior art fishing lures tails have been attached to fishing lure bodies to enhance fish attraction. These tails have required separate attaching procedures at additional expense and with detracting appearance. In contrast, the present invention provides a tail construction that is simply and inexpensively embedded during molding of a plastic body without any separate attaching procedure or visible connection means.

Further, many additional components have been devised to enhance the fish attraction of lures and the present invention does this in a manner that results in a relatively inexpensive and easily manufactured component that may be adjusted for versatility in selecting a desired appearance.

SUMMARY OF THE INVENTION

Briefly described, the fishing lure of the present invention has a body with a surface that is formed with a plurality of small closely spaced pockets of sufficient depth in relation to the material of the body for releasable retention of air bubbles in the pockets when the lure is immersed in water. The air bubbles provide an attractive glistening scaly appearance and in releasing from the surface the rising bubbles give the effect of life-like breathing of the lure. In the preferred embodiment the body is formed of soft moldable plastic and the pockets are generally semispherical. Some of the pockets may extend to a depth substantially greater than their surface extent to form longer bubbles that are not as readily released and some of these pockets may extend fully through the body. In another embodiment the body includes a sheet of material adhered thereto and having the aforesaid surface of pockets formed therein.

Attached to the moldable plastic body is a tail of a different material. The tail has an inner end embedded in the molded plastic body and an outer end projecting freely therefrom. Preferably the tail is either in the form of a flat flexible strip that is curved to produce a wavy appearance when drawn through water or it is in the form of a multiplicity of hair-like strands having ends embedded in the body and projecting therefrom. In the embodiment of the flat flexible strip, the inner end embedded in the body has at least one hole therethrough for securement of the body material therein and is coated with a stiffener that rigidifies the inner end for proper positioning during molding of the body with the tail embedded therein. In the embodiment of the hairlike strands the tail has a base at its inner end embedded in the molded plastic body with the hairlike strands secured to and extending from the base, which is preferably made using fusible plastic strands and fusing the inner ends together to form the base.

The present invention also includes a fishing lure component in the form of an outwardly projecting array of hairlike strands having inner ends secured in an attaching ring that is carriable on a fishing lure. In the preferred embodiment the strands are arranged in sets with the strands of each set being formed with a common base, as by forming the strands of fusible plastic and fusing the ends to form the common base, and the sets are adjustably positionable around the ring for selective disposition of the strands thereabout.

With any of the foregoing embodiments a hook may be disposed projecting from the body and curved forwardly and inwardly toward the body to a point and a soft plastic weed bumper is impaled on the hook point and extends therefrom into contact with the body.

BRIEF DESCRIPTION OF THE DRAWINGS

FIG. 1 is a side elevation of a fishing lure according to one embodiment of the present invention and showing the tail thereof in the disposition it is in when drawn through water;

FIG. 2 is a view similar to FIG. 1 showing the tail in its inactive disposition;

FIG. 3 is a rear elevation of the fishing lure of FIG. 2;

FIG. 4 is a top plan view of the fishing lure of FIG. 2;

FIG. 5 is a side elevation of a variation of the fishing lure of FIG. 1, showing the tail in solid lines in its disposition when being drawn through water and in dash lines showing the inactive disposition;

FIG. 6 is a top plan view of another variation of the fishing lure of FIG. 1 showing two projecting ends on the tail with solid lines indicating the position when drawn through water and dash lines indicating the inactive position of the tail ends;

FIG. 7 is a side elevation of the tail of the fishing lure of FIG. 2 separate from the body of the lure;

FIG. 8 is a series of enlarged sections of surface portions of fishing lure bodies of the present invention showing pockets of different depths varying from shallow to fully through the body;

FIG. 9 is a side elevation of another embodiment of the fishing lure of the present invention using a tail of a different type than that used in the lure of FIG. 1;

FIG. 10 is a side elevation of the tail of the fishing lure of FIG. 9;

FIG. 11 is a side elevation of a fishing lure similar to that of FIG. 9 showing a varied disposition of the tail;

FIG. 12 is a perspective view of another embodiment of the fishing lure of the present invention;

FIG. 13 is a side elevation of the fishing lure of FIG. 12;

FIG. 14 is an enlarged sectional view of a portion of the surface of the fishing lure of FIG. 12 showing the air bubble retaining pockets;

FIG. 15 is a perspective view of a variation of the fishing lure of FIG. 12;

FIG. 16 is a side elevation of a fishing lure similar to that shown in FIG. 12 with a fishing lure component added thereto according to an embodiment of the present invention;

FIG. 17 is an enlarged front elevation of the center portion of the fishing lure component included in the lure illustrated in FIG. 16;

FIG. 18 is an enlarged side elevation of the center portion of the fishing lure component of FIG. 17; and FIG. 19 is a perspective view of a sheet of material capable of adhering to a fishing lure body and having a surface of pockets formed thereon.

DETAILED DESCRIPTION OF THE PREFERRED EMBODIMENTS

Referring first to the embodiments illustrated in FIGS. 1–7, the fishing lure 20 is formed with a body 21 and a tail 22. The body 21 is formed of any soft moldable plastic material such as those commonly used for manufacturing artificial fishing worms and lures. In this form of the embodiment the surface 23 of the body 21 is formed with a plurality of shallow, closely spaced pockets 24 that are capable of temporarily retaining air bubbles when the lure is immersed in water to give a glistening scaly appearance and will release the air bubbles sporadically upon agitating to provide a life-like breathing effect of a fish attracting nature.

The unique use of closely spaced air bubble retaining pockets 24 is one of the primary features of the present invention in combination with or apart from the other features. These pockets may be of various sizes and depths to obtain varying results. They must be deep enough to receive and retain air bubbles at least temporarily when the lure is cast or otherwise immersed in water in order to obtain the glistening scaly appearance and the breathing bubble release effect. With soft plastic material of the various types used with conventional lures the pockets may be relatively shallow, such as shown in the first section at the left in the cross-section of FIG. 8. Due to the material and surface tension this shallow depth is sufficient to receive and temporarily retain air bubbles. With harder plastic deeper pockets are required and with metal a semi-spherical configuration, such as shown in the second section from the left in FIG. 8, is required. In fact, the semi-spherical configuration is preferred as well for plastic bodies.

When the lure 20 is cast or otherwise immersed in water the bulk of the captured air bubbles will remain in the pockets 24 and will sporadically escape over a period of time, principally when the lure is jigged or subjected to other agitation, with only some air bubbles escaping upon each jigging or agitation. This gives the appearance of a live bait with the air bubbles resembling shiny scales when on the lure and gives the visual and vibrational effect of a breathing minnow when the bubbles release.

The period of time over which the bubbles are sporadically released and the severity of the jigging or agitation required to release bubbles is directly proportional to the depth of the holes, which may be varied on different lures or over the surface of the same lure. FIG. 8 shows varying depth pockets with the first section from the left showing the aforementioned shallow pockets 24, the second section showing the aforementioned semi-spherical pockets 24(a), the third section showing moderately deep pockets 24(b) that form larger bubbles that are not as rapidly or easily released, the fourth section showing even deeper somewhat cylindrical pockets 24(c) that may release portions of the retained air rather than the entire air from each pocket at one time, and the fifth section showing pockets 24(d) extending fully through the body of the lure to form larger bubbles that break away in portions from both sides of the lure over an extended period of time and requiring substantial jigging or agitation to complete the release of substantially all of the air.

The tail 22 of the embodiment of FIGS. 1–7 is in the form of a flat flexible strip of material such as chamois as disclosed in copending U.S. Patent Application Ser. No. 544,036, filed Jan. 27, 1975, for Fishing Lure, now U.S. Pat. No. 3,964,203, issued June 22, 1976. This tail 22 has an inner end 25 embedded in the molded plastic body 21 and an outer end 26 projecting freely from the body 21 and having a curved configuration (FIG. 2) to produce a wavy appearance (FIG. 1) when the lure is drawn through water. Embedding of the inner end 25 of the tail 22 in the body 21 during molding of the body results in an inexpensive and simple manufacturing operation and further locks the tail 22 securely in the body 21 so that it cannot normally be pulled therefrom even when attacked by fish. Further, the embedding of the tail in the body eliminates any detracting exterior attaching means. To enhance the securement of the tail 22 in the body 21, the inner end 25 of the tail 22 is formed with a hole 27 extending therethrough and through which the molded plastice material of the body 21 extends during the molding operation. Further, the inner end 25 of the tail 22 is coated with a stiffening material 28 (FIG. 7), such as lacquer, so that the flexible strip will remain properly positioned during the molding operation and will not be deflected by the flow of plastic during molding.

In the variation illustrated in FIG. 5, the tail 222′ is longer and has more curvature than the tail 22 of FIGS. 1–4 and 7 and is provided with three holes 27′ in its inner end 25′ for increased securement of the tail 22′ in the body 21.

In the variation of FIG. 6, the tail 29 has two outer ends 30 projecting from a single inner end 31 that has a hole 32 in it for the same purpose as the hole 27 of the embodiment of FIG. 1. Both of the outer ends 30 of the tail 29 of the variation of FIG. 6 are curved to produce the same type of wavy appearance as in the previously described variations.

In the embodiment of FIGS. 9 and 10, the lure 40 includes a body 41 identical to the body 21 of the embodiment of FIG. 1 and is shown mounted on a hook 42 that has a head 43 in advance of the body 41. In this embodiment the tail 44 is in the form of a multiplicity of hair-like strands having ends 45 embedded in the moldable plastic body 41 and projecting therefrom. This tail 44 has a base 46 (FIG. 10) at its inner embedded end with the hair-like strands secured to and extending from the base 46. The base forms an anchor for the firm securement of the strands in the body 41 with the moldable plastic of the body encompassing the base 46 with much more securement than could be obtained on individual strands. In the illustrated embodiment, the hair-like strands are made of fusible plastic material commonly used in the manufacture of fishing lures and the base 46 is formed by fusing together the ends of the strands to form the composite tail 44. In the form of FIGS. 9 and 10, the tail 44 is disposed so that the strands extend directly rearwardly, but this may be varied as desired for particular purposes and the tail may be located anywhere desired on the lure. For example, in FIG. 11, the tail 44′ is disposed with respect to the body 41′ to project upwardly and provide a somewhat rooster-like tail appearance. Also, if desired, an auxiliary tail 47 may be attached to the hook 42 as indicated in FIG. 9. This auxiliary tail 47 may be in the form of the tail 22 of the embodiment of FIG. 1 using the hole 27 for mounting of the tail 47 on the hook 42. The embedded strand tail of this embodiment of FIGS. 9-11 may be utilized with or without the bubble retaining feature described above.

Referring now to the embodiment of FIGS. 12-14, the fishing lure 50 includes a body 51 of soft moldable plastic of any of the types commonly used for making artificial fishing worms and lures. This body 51 is seen mounted on a hook 52 that has an enlarged head 53 against which the body 51 is disposed. Projecting rearwardly from the body 51 is a hair-like strand tail 54 similar to the tail 39 of the embodiment of FIGS. 9 and 10.

The surface of the body 51 of the embodiment of FIGS. 12-14 is formed with a plurality of pockets 55 for releasable retention of air bubbles therein when the lure 50 is immersed in water. For suitable air bubble retention, the pockets 55 are generally semispherical in configuration and relatively small, for example, the diameter of the pockets may be 1/16 inch. These pockets 55 substantially cover the surface of the body 51 to provide a myriad of air bubbles B (FIG. 14) over the surface of the body 51. These bubbles B provide a glistening scaly appearance for fish attraction and also provide a life-like appearance to the lure when the bubbles are released and rise in the water as though from a live prey. In addition, the head 53 of the hook 52 is formed with pockets, some being of the deep type 24(c) and others 24(d) extending fully through the head 53 both as illustrated in FIG. 8.

When the lure 50 of the embodiments of FIGS. 12-14 is cast through the air, any water in the pockets 55 is thrown off so that air bubbles will be captured in the pockets 55 as the lure 50 enters the water. The size and configuration of the pockets 55 is such that bubbles B will not escape rapidly while the lure is in the water and will normally not escape unless the lure is jerked, in which case a few bubbles will escape with each action, leaving the other bubbles in place to provide the glistening appearance and to allow escape during subsequent action.

To provide the lure 50 of FIGS. 12-14 with a somewhat weedless hook feature, a soft plastic bumper 56 is impaled on the point 52' of the hook 52. In this arrangement the hook projects from the body 51 forwardly and inwardly toward the body to its point 52' and the bumper 56 covers the point 52' and extends therefrom into surface contact with the body 51. Thus, as the lure 50 is drawn through the water any weeds or other impediments would be fended off by the bumper and yet the soft material of the bumper would not interfere with the catching of fish on the hook 52. This type of bumper 56 may be used with any of the embodiments of the present invention and could be formed with air bubble pockets on its surface.

A variation of the embodiment of FIGS. 12-14 is illustrated in FIG. 15 wherein the lure 57 is in the form of a plastic worm having a surface formed with pockets 58 similar to the pockets 55 in the embodiment of FIGS. 12-14 and having a similar tail 59 projecting therefrom.

In any of the previously described embodiments and variations, the lure can be enhanced by the addition of a component 60 of the type illustrated in FIGS. 16-18. In this embodiment, the component 60 is mounted on a lure 50 of the type illustrated in FIGS. 12-14 between the body 51 and the head 53 of the hook 52, and the lure includes a similar tail 54. This fishing lure component 60 is in the form of an outwardly projecting array 61 of hair-like strands having inner ends 62 secured in an attaching ring 63 that surrounds the hook 52 at its head 53. The attaching ring 63 is a double coil ring with ends 64 (FIG. 18) under which the array of strands 61 can be inserted and are retained. With this arrangement the array 61 of strands can be adjustably positioned around the ring for selective disposition thereabout in any desired symmetry or dissymmetry. To facilitate this selective dispositioning, the array 61 of strands is preferably divided into a plurality of separate sets 65 with each set having a base 66 inside of the ring 63 for retention of the sets 65 therein and to permit manipulation of the sets separately. Preferably these bases 66 are formed in the same manner as the base 41 of the hair-like strand tail 39 of the embodiment of FIGS. 9 and 10, being fused together ends of fusible strands. In the embodiment illustrated there are three sets 65 of strands, but the number of sets could be varied one to any number as desired.

In the preceding embodiments the pocket surface has been formed integrally on the body of the lure, but it is contemplated that the pocket configuration may be provided on an existing lure by using sheet material 70 such as illustrated in FIG. 19, which may be, for example, aluminum foil, performed with pockets 71 of the aforementioned type and secured to a lure body by the use of an intermediate adhesive strip or coating 72. Thus, existing lures can be readily adapted to the air bubble pocket feature of the present invention.

It should be noted that other materials than those specifically mentioned herein may be used for the embedded tails and that variations in material, construction and configuration are within the scope of the present invention. The particular embodiments disclosed in detail herein and illustrated in the drawings have been provided for disclosure purposes only and are not intended to limit the scope of the present invention, which is to be determined by the scope of the appended claims.

What I claim is:

1. A fishing lure having a body of soft plastic material with a surface that is formed with a plurality of small closely spaced pockets of generally semispherical configuration having internal surface characteristics for releasable retention of air bubbles in said pockets when said lure is immersed in water to provide a glistening scaly appearance and a life-like breathing effect upon release of air bubbles.

2. A fishing lure according to claim 1 and characterized further in that said body includes a sheet of material adhered thereto and having said surface of pockets formed thereon.

3. A fishing lure according to claim 1 and characterized further in that said soft plastic material is moldable, and by a tail of strand material different from that of said body and having an inner end embedded directly in said molded plastic body and an outer end projecting freely from said body.

4. A fishing lure according to claim 1 and characterized further by a hook projecting from said body and curved forwardly and inwardly toward said body to a point, and a soft plastic weed bumper impaled on said hook point and extending therefrom into contact with said body.

5. A fishing lure comprising a body of soft moldable plastic material, and a tail of strand material different from that of said body and having an inner end embedded directly in said moldable plastic body and an outer end projecting freely from said body.

6. A fishing lure comprising a body of soft moldable plastic material, and a tail in the form of a flat flexible strip having an inner end embedded directly in said moldable plastic body and an outer end projecting freely from said body.

7. A fishing lure according to claim 6 and characterized further in that said flat flexible strip is curved to produce a wavy appearance when drawn through water.

8. A fishing lure according to claim 6 and characterized further in that the inner end of said flat flexible strip is formed with at least one hole therethrough for extension of the molded plastic material of said body therein to secure said tail in said body.

9. A fishing lure according to claim 6 and characterized further in that said inner end of said flat flexible strip is coated with a stiffening material that rigidifies the inner end of the strip for proper positioning during molding of said body with the tail embedded therein.

10. A fishing lure according to claim 6 and characterized further in that said tail has at least two outer ends projecting freely from said embedded end.

11. A fishing lure according to claim 9 and characterized further in that said tail is in the form a multiplicity of hair-like strands having ends embedded directly in said body and projecting therefrom.

12. A fishing lure according to claim 11 and characterized further by an outwardly projecting array of hair-like strands having inner ends secured in an attaching ring carried exteriorly by said lure.

* * * * *